3,008,949
LOW PRESSURE POLYMERIZATION OF OLEFINS
Arthur W. Langer, Jr., Watchung, and Charles E. Morrell, Summit, N.J., assignors to Esso Research and Engineering Company, a corporation of Delaware
No Drawing. Filed Apr. 25, 1958, Ser. No. 730,766
4 Claims. (Cl. 260—94.9)

The present invention relates to polymerization catalysts. More particularly, the invention relates to low pressure polymerization catalysts prepared on a carbon black catalyst support which are useful for the polymerization of olefins, and to the preparation of polyolefins therewith.

Prior to the present invention, it was found that ethylene and other olefins such as propylene, butylene, isobutylene and the like can be polymerized at relatively low pressures not substantially exceeding atmospheric pressure in a liquid reaction medium when using various combinations of reducing metals or metal compounds, e.g. alkali and alkaline earth metals, their hydrides and alloys; aluminum compounds, such as aluminum hydrides, aluminum alkyls, e.g. aluminum trialkyls, alkyl aluminum halides and the like with various reducible heavy metal compounds, such as the halides, acetyl acetonates, and the like of the metals of groups IV through VI and VIII of the periodic table, e.g. of titanium, zirconium, vanadium, chromium, molybdenum and iron. See e.g. Belgian Patent 533,362; "Chemical and Engineering News," April 8, 1957, pages 12 through 16; and "Petroleum Refiner," December 1956, pages 191 through 196.

It was also found prior to the instant invention that the introduction of carbon black into polymers and copolymers of olefins results in improved properties for the polymer mixture. Carbon black has typically been incorporated into polymers by mixing finely divided polymers with carbon black in mixing equipment such as ball milling equipment, Banbury mixers, rubber compounding equipment, and the like. However, the physical incorporation of carbon black into polymers is difficult and time consuming and frequently results in uneven distribution of carbon black through the polymer.

It has now been found that when the polymerization of olefins is carried out with a catalyst prepared by reacting a reducing metal containing material with a reducible heavy metal compound in an inert diluent in the presence of carbon black, the polymers produced thereby contain relatively large quantities of carbon black evenly dispersed throughout, resulting in products having excellent physical properties.

In general, the carbon black catalyst support forms a major proportion of the finished catalyst so as to afford the largest catalyst surface and the highest catalyst dispersion possible and to result in the incorporation of large quantities of carbon black per quantity of catalyst residue in the finished polymer. From 50 to 99.5 wt. percent preferably 90 to 99 wt. percent carbon black based on the weight of total catalyst is used.

Any type of carbon black can be used in the invention such as furnace blacks, channel blacks, thermal blacks, lamp blacks, acetylene blacks and the like. Various carbon blacks with different hardness characteristics can be employed, such as semi-reinforcing carbon black, medium thermal carbon black, high modulus furnace carbon black, super abrasion furnace carbon black and the like. Carbon black is a "tradename given to the finely-divided carbon produced from burning hydrocarbons, such as mineral oils, in conditions where combustion is incomplete" (Chambers Technical Dictionary, W. & R. Chambers, Ltd., London, 1954).

Reducing, metal-containing materials suitable for use as a catalyst component include those materials employed and described in the art for the low-pressure, liquid-phase polymerization of low molecular weight olefins to form high molecular weight polymers. Thus, a list of suitable reducing metal-containing materials includes the alkali and alkaline earth metals, their alloys, and their alkyl and/or aryl compounds, and alkyl and aryl derivatives of other metals which have sufficient stability to permit reaction in their compound form with a reducible heavy metal compound, e.g. organo-aluminum compounds, such as triisobutyl aluminum, tripropyl aluminum, triethyl aluminum, dialkyl aluminum halides such as diethyl aluminum halides, dimethyl aluminum halides, methyl and ethyl aluminum dihalides. Organo-aluminum compounds with two hydrocarbon radicals or at least one hydrocarbon radical and one hydrogen, and containing an electron-attracting group such as an alkoxy, halogen, organic nitrogen and the like can be used. Mixtures of the above reducing compounds can also be used, such as mixtures containing diethyl aluminum chloride and triethyl aluminum. The organo-aluminum compounds, especially trialkyl aluminum and dialkyl aluminum halide, are preferred herein. All of the above compounds and the methods for their preparation are well known to the art.

Reducible heavy metal compounds useful in the present invention include hydrocarbon-soluble inorganic compounds such as the halides, oxy-halides, complex halides, and organic compounds such as alcoholates, acetates, benzoates, and acetyl acetonates of the transition metals of the IV, V, VI and VIII groups of the periodic system, e.g. titanium, zirconium, hafnium, thorium, uranium, vanadium, niobium, tantalum, chromium, molybdenum, tungsten, and iron. The metal halides, particularly the chlorides, are generally preferred. Titanium and zirconium are the preferred metal components since they are the most active of these metals. Titanium tetrachloride is the reducible heavy metal compound particularly preferred herein.

The catalysts are prepared by intimately mixing the reducing metal-containing material, the reducible heavy metal compound, and carbon black in an inert diluent and in a non-oxidizing atmosphere with stirring. Paraffinic hydrocarbons such as butane and other saturated petroleum or synthetic hydrocarbon oils are suitable inert diluents, although aromatic solvent such as benzenes, toluene and chlorobenzene can also be used. Mixtures of any of the above inert diluents can be employed.

The molar ratio of the reducing metal-containing material to the reducible heavy metal compound in the catalyst mixture can vary widely. In general, the higher the polymer molecular weight desired the higher the ratio. From 0.2 to 12 parts, preferably 0.2 to 6, and most preferably 1 part of reducing metal-containing material per part of reducible heavy metal compound is used.

The quantity of diluent used to prepare the carbon black-supported catalyst, based on the total weight of catalyst components and carbon black, is not critical, but in general from 10 to 50 parts of diluent are used per part of total catalyst (i.e. catalyst components plus carbon black).

The polymerization process employing the above catalysts is carried out at conditions normally used in the art in the low-pressure polymerization of olefins to high molecular weight polymers. These conditions depend somewhat on the specific olefin employed and on the type of polymer composition desired. Ethylene and propylene are the preferred olefins used herein, although other olefins, such as butylenes, styrene, butadiene and the like can be used alone or in mixtures. The polymers produced have molecular weights above 2000 and may range up to about 3,000,000 and more as determined by the intrinsic viscosity method using the I. Harris Correlation (J. Polymer Science, 8, 361 (1952)). The polymerization is carried out by intimately contacting gaseous olefins with the catalyst of the invention, for example by bubbling the olefin into a suspension of the catalyst in an inert diluent. Neither the polymerization temperature nor the polymerization pressure is critical although temperatures of 0 to 150° C., preferably 25 to 90° C., and pressures from subatmospheric to 250 atmospheres can be used. The reaction is preferably carried out under careful exclusion of oxygen and water by stirring in batch or continuous operation. The diluents used in the polymerization reaction should be liquid at the operating conditions employed and include aliphatic and hydroaromatic and aromatic hydrocarbons, such as butane, hexane, naphthanes, benzene, xylene, halogenated aromatic hydrocarbons, such as the chlorobenzenes, and mixtures of any of the above. In general, the same diluent used in the preparation of the carbon back-supported catalyst is used in the polymerization reaction. The polymer concentration in the polymerization reaction mixture can be in the range of 5 to 40 wt. percent, based on the weight of the diluent, for easy handling of the reaction mixture.

The amount of catalyst used can vary within wide limits depending on such factors as the purity of the olefin feed and the quantity of carbon black desired to be incorporated into the polymer. In general, the quantity of carbon black-supported catalyst used is related to the weight of catalyst components per weight of carbon black chosen, and is selected to yield polymer-carbon black products containing from 1 to 60 wt. percent, preferably 5 to 40 wt. percent carbon black, based on the weight of the carbon black-polymer product.

Upon completion of the polymerization reaction, the catalyst is completely deactivated by any standard technique, such as by the addition of an alcohol, e.g. isopropyl alcohol or n-butyl alcohol, in amounts of about 10 to 100 times the amount of catalyst used. The reaction product is then filtered or otherwise physically isolated, reslurried in a catalyst solvent such as dry concentrated alcohol at about 50 to 100° C. for 15 to 60 minutes, filtered or otherwise isolated again and dried. Alternatively, the product can be used without reslurrying in a catalyst solvent since in general ash residues will be low with this technique.

The invention will be better understood by reference to the following examples.

EXAMPLE I

A polymerization catalyst was prepared by dissolving 1.0 gram of diethyl aluminum chloride in 80 cc. of n-heptane and 0.8 g. of titanium tetrachloride in 50 cc. of n-heptane. The titanium tetrachloride solution was then mixed with 70 cc. of a heptane slurry containing 10 g. of super abrasion furnace black having a surface area of 175 cm.²/g. and which was carefully prepared in a nitrogen atmosphere. Then the diethyl aluminum chloride solution was added and the reaction between the catalyst components was allowed to proceed for 15 minutes at 50° C. at the end of which time 450 cc. of heptane was added and gaseous ethylene passed into the mixture at atmospheric pressure and at a temperature varying from 32 to 65° C. for 5 hours. During the run an additional 800 cc. of heptane was added to reduce the slurry viscosity and 0.5 g. of AlEt₃ was added to further increase catalyst activity. Thereafter 150 cc. of isopropyl alcohol was added to inactivate the catalyst and the resulting reaction mixture filtered, the polyethylene-carbon black product washed with alcohol, and dried. The quantities of catalyst components, the catalyst preparation conditions, the polymerization reaction conditions and the yield and properties of the polyethylene-carbon black product are given in Table I.

EXAMPLE II

A polymerization catalyst was prepared and ethylene was polymerized according to the process of Example I using a larger proportion of carbon black. The quantities of components and conditions are shown in Table I. The yield and properties of the polyethylene-carbon black product obtained are also given in Table I.

EXAMPLE III

Additional polyethylene samples were prepared according to the process of Example I except that no carbon black was employed. These polyethylene samples had tensile strengths between 3000 and 4000 p.s.i., elongations of from 50 to 500%, softening points of 120° to 140° C. and melting points of 130 to 190° C. The catalyst preparation, ethylene polymerization conditions, polyethylene yield and properties of a representative sample is given in Table I for comparison purposes.

*Table I*

|  | Example I | Example II | Example III |
| --- | --- | --- | --- |
| Catalyst Preparation: |  |  |  |
| TiCl₄, g | 0.8 | ¹ 0.8 | 0.8 |
| AlEt₂Cl, g | 1 | ¹ 0.5 | 0.5 |
| Carbon black, g | 10 | 50 | none |
| n-Heptane, total ml | 200 | 200 | 200 |
| Temperature, ° C | 50 | 50 | 50 |
| Time, minutes | 15 | 15 | 10 |
| Ethylene Polymerization: |  |  |  |
| Temperature, ° C | 32–65 | 30–65 | 28–70 |
| Time, hours | 5 | 2.25 | 5 |
| n-Heptane, starting vol. ml | 650 | 650 | 650 |
| n-Heptane, final vol. ml | 1,450 | 1,200 | 1,450 |
| Polyethylene Product: |  |  |  |
| Yield, g | ² 194 | ² 178 | 145 |
| Carbon black, wt. percent | 5.1 | 28 | none |
| Softening Point, ° C | 155 |  | 128 |
| Melting Point, ° C | 207 |  | 134 |
| Tensile strength, p.s.i | 3,950 | 5,100 | 2,690 |

¹ An additional 1.6 g. TiCl₄ and 2.0 g. AlEt₂Cl added at start of polymerization.
² Polyethylene plus carbon black.

As can be seen from the above table, the polyethylene-carbon black compositions of Examples I and II prepared in accordance with the invention have softening points, melting points, and tensile strength properties superior to the polyethylene of Example III prepared in the absence of carbon black. In addition to the above improved product properties, the polymerization process of the present invention has the following advantages over polymerization reactions carried out with similar catalysts not supported on carbon black; (1) no skin formation or reactor fouling during the polymerization reaction since the reducible heavy metal compound present is adsorbed on the carbon black so that no partially reduced metal compound is formed on the reactor walls resulting in polymerization thereon, (2) no necessity for adding carbon black on hot mills, (3) very intimate incorporation of carbon black into the polymer, and (4) incorporation of carbon black into the polymers leads not only to the improved physical properties shown above, but also to improved weathering properties, decreased stress cracking, improved resistance to ultra violet light, and other improved properties.

EXAMPLES IV AND V

A sample of polyethylene prepared by a process similar to that of Example I but in the absence of carbon black and having a tensile strength of 3610 p.s.i. was milled with 5 and 25 wt. percent carbon black in Examples IV and V respectively. The tensile strengths of the resulting carbon black-polyethylene blends are given in Table II.

Table II

|  | Example IV | Example V |
|---|---|---|
| Carbon Black, wt. percent | 0 | 5 | 25 |
| Tensile strength, p.s.i | 3,610 | 3,800 | 4,490 |

It can be seen from the above table that the physical incorporation of 5% carbon black into polyethylene increases its tensile strength less than 200 p.s.i. The incorporation of 5% carbon black into polyethylene by the process of the invention, however, increases its tensile strength more than 1200 p.s.i. (Table I).

The invention is not limited to the above examples which are given for illustration purposes only. Variations of the invention can be made by those skilled in the art without departing from the scope or spirit of the invention.

What is claimed is:

1. In a low pressure process of polymerizing ethylene with a catalyst system consisting essentially of a halide of titanium and an aluminum alkyl compound selected from the group consisting of trialkyl aluminum and dialkyl aluminum halide, in the presence of an inert diluent and at a temperature of 0 to 150° C., the improvement which comprises employing a carbon black as a support for the catalyst system in an amount of 50 to 99.5 wt. percent based on catalyst whereby reactor fouling is reduced and the carbon black is dispersed in the polymer product, said carbon black being selected from the group consisting of furnace blacks, channel blacks, lamp blacks, and acetylene blacks.

2. The process of claim 1 wherein said inert diluent is heptane.

3. The process of claim 1 wherein the alkyl aluminum compound is a dialkyl aluminum chloride.

4. The process of claim 3 in which the dialkyl aluminum chloride is diethyl aluminum chloride and the titanium compound is titanium tetrachloride.

References Cited in the file of this patent

UNITED STATES PATENTS

| 2,824,089 | Peters et al. | Feb. 18, 1958 |
| 2,827,445 | Bartolomeo et al. | Mar. 18, 1958 |
| 2,843,577 | Friedlander et al. | July 15, 1958 |
| 2,888,424 | Precopio et al. | May 26, 1959 |

FOREIGN PATENTS

| 534,792 | Belgium | May 2, 1955 |
| 545,857 | Belgium | Sept. 7, 1956 |

OTHER REFERENCES

Emmett: "Catalysis," vol. 1, pages 259, 266, 267, Reinhold, New York, 1954.